March 27, 1945. W. K. PORTEOUS 2,372,448
CONTROL SYSTEM FOR REGULATING THE CO-ORDINATED
FILLING AND EMPTYING OF VESSELS
Filed Aug. 25, 1942
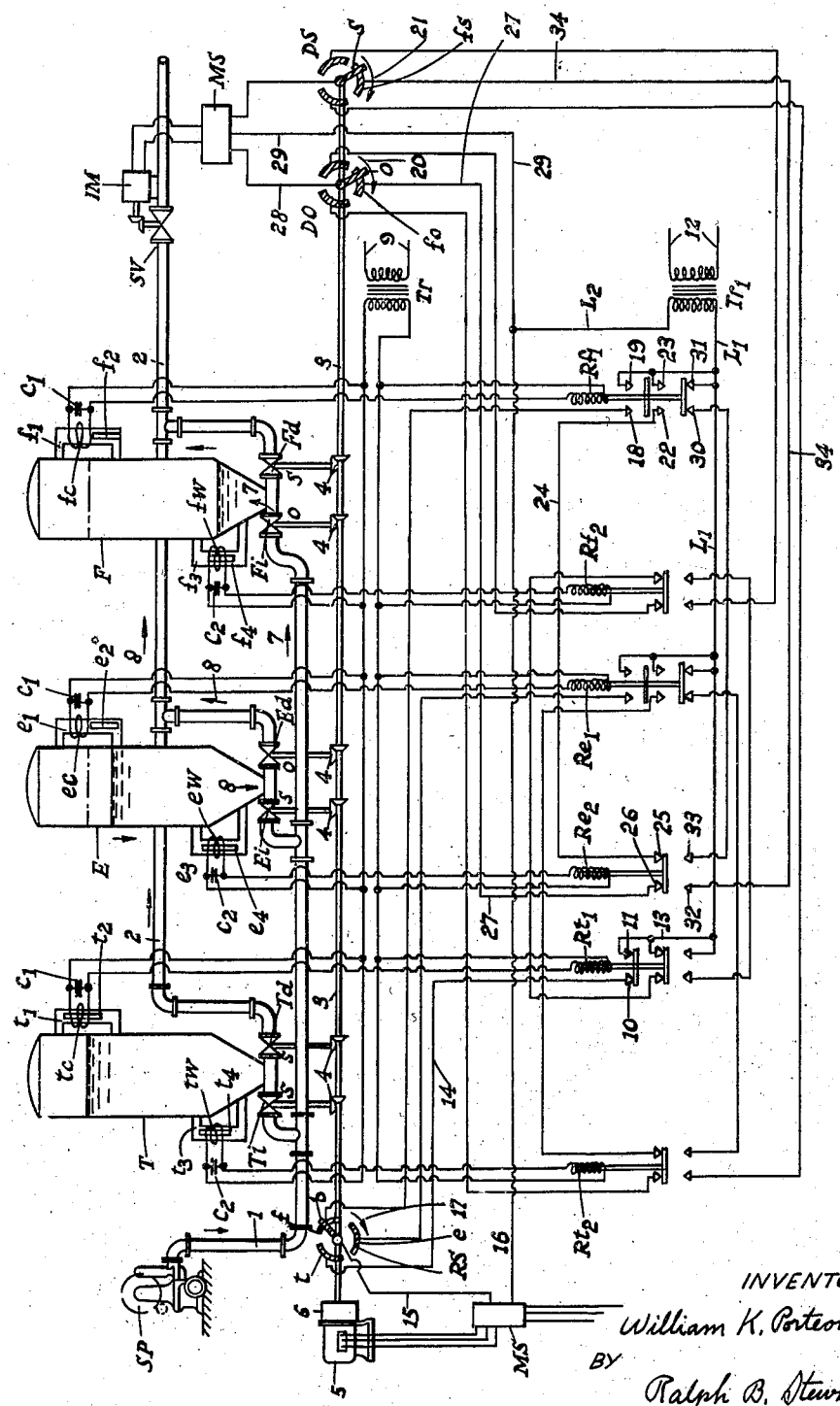
INVENTOR
William K. Porteous
BY
Ralph B. Stewart
ATTORNEY Patented Mar. 27, 1945

2,372,448

UNITED STATES PATENT OFFICE 2,372,448

CONTROL SYSTEM FOR REGULATING THE CO-ORDINATED FILLING AND EMPTYING OF VESSELS

William King Porteous, St. Margarets, England, assignor of fifteen one-hundredths to Towler & Son Limited, London, England Application August 25, 1942, Serial No. 456,073
In Great Britain October 21, 1941

12 Claims. (Cl. 137—68)

It is frequently required to employ a number of vessels, such as tanks for the treatment of sewage sludge, which have to be filled with liquid or a material capable of flowing, such as material in the powdered or quasi-liquid condition, and which have to be discharged at recurring intervals. It is necessary to arrange that while one vessel is being filled another is being emptied, and possibly during that time, the contents of one or more further vessels have to undergo some form of treatment so that each vessel passes in turn through the same cycle of operations. In the case of plant for treatment of sewage sludge, which has to undergo a heating or cooking treatment for a given period, it is possible to arrange for one or more tanks to remain filled with sludge for a definite period of time while its contents are undergoing the treatment, and it is also convenient to empty a tank in which the contents have already been treated and to fill yet another tank in preparation for treatment at such rates that the emptying and filling occupy the same time as the treatment period. At the conclusion of such a period, matters must be so arranged that the tank in which the treatment has been carried out is emptied, and simultaneously the treatment commences in the tank which has just been filled. There is, therefore, a problem of so co-ordinating the operations in the different tanks that among other things the emptying of one tank is completed practically simultaneously with the filling of another tank.

The object of the present invention is to provide a plant in which the cyclic filling and emptying of such a number of vessels is controlled in a simple fashion, and the necessary change-over or opening and closing of inlet and discharge valves of the vessels may be accurately controlled, for example, by electrical means.

According to the invention, the cyclic filling and emptying of two or more vessels is controlled by arranging the change-over from one phase of operation to the next to be effected in dependence upon the time at which the contents of a vessel being filled, or of a vessel being emptied, reaches a predetermined level by employing an electric controlling device set into operation when the surface of the material in the vessel being filled or emptied reaches the predetermined highest or lowest level. When at least three vessels are each furnished with an inlet valve and a discharge valve, the electric controlling device then effects the change-over to a following phase of operation by causing the closure of the inlet valve of the vessel just filled, the opening of the inlet valve and the closure of the discharge valve of the vessel last emptied, and the opening of the discharge valve of the vessel to be emptied during the next phase of operation.

A simple form of electric controlling device may be used for this purpose making use of the well-known system of operating relays by utilising the resonance effects on tuning an electric circuit containing inductance and capacity. Thus, the device may consists of a pipe similar to a gauge glass connected at its two ends to suitable points in the vessel with which it is associated, and a magnetic float or plunger in the pipe which can move up into a coil surrounding the pipe when the contents of the vessel reach the higher level and can fall out of the coil under other conditions. The cyclic change-over of the valves of the vessels under control of such a device may conveniently be effected by an electric motor which is started at the completion of the filling of each of the vessels, and in order to stop the motor when the changeover is effected, a step-by-step distributor switch driven by the motor itself may be connected in its starting circuit so as to interrupt the circuit of the motor at the right time and to prepare the starting circuit to be closed again when the next vessel is completely filled. The coil of the controlling device has its inductance increased when the core is moved into it, and by connecting a condenser of suitable capacity across the coil depending on the frequency of the alternating current supply, it may be arranged that the increased inductance sets up resonance conditions resulting in a material increase in current flowing through a relay winding in circuit with it so that the relay is actuated and completes the starting circuit of the motor which then proceeds to change-over the valves.

It is desirable to arrange for accelerating or retarding the process of emptying any tank relatively to the filling of another tank in case it should happen that the completion of the emptying process tends to lag behind or to precede the operation of filling the other tank. This may be effected by controlling the setting of an adjustable valve in the discharge manifold from the vessels. In order slightly to open or close that valve when it is necessary to accelerate or retard the process of emptying any tank, each vessel is provided with a second or low-level electric controlling device which may be of an exactly similar construction to the high-level controlling device, but is set into operation upon a vessel being emptied or its contents falling below a predetermined low level. Then, depending on whether the tank being filled is filled before the tank being emptied is emptied, the control valve in the discharge manifold is slightly opened or closed. This may be effected by a known form of electric motor which moves in one direction or the other to a small extent upon the reception of a positive or negative electric impulse. It may be arranged that if emptying is completed before filling another tank and therefore requires retarding, a circuit through a step-by-step distributor switch driven from the motor which changes over the valves passes a positive impulse to the motor which slightly closes the valve in the discharge manifold, whereas if the other tank is filled before the first-mentioned tank is empty, a circuit through another step-by-step distributor switch passes a negative impulse to the valve motor. This may be arranged by interconnecting the forward and back contacts of relays in the circuit of the controlling device for the low level on the tank being emptied, and in the circuit of the controlling device for the high level in the tank being filled. Of course, if the emptying and filling of the respective tanks is completed substantially simultaneously, no impulse passes and the control valve in the discharge manifold is not given any fresh adjustment.

In order that the invention may be clearly understood and readily carried into effect, a system applied to the control of the filling and emptying of three sewage tanks will be described by way of example with reference to the accompanying drawing, which is a diagrammatic illustration of the essential parts of such a system and of the electrical control circuits.

In the example illustrated, there are three closed metal tanks T, E and F, which in the phase of operations illustrated in the drawing, are respectively with their contents under treatment, in process of being emptied, and in process of being filled. Each tank is fitted near the bottom with an inlet valve $Ti$, $Ei$, and $Fi$, and with a discharge valve $Td$, $Ed$, and $Fd$. These valves are illustrated conventionally as stop valves, and in order to indicate for the benefit of the following description of operation of the system, the condition of the valves in the phase illustrated, the valves which are shut are marked S and those which are open are marked O. The valves $Ti$, $Ei$ and $Fi$ are connected to an inlet manifold I into which the sludge to be treated is pumped by a sludge feed pump SP which can be assumed to be driven by a three-phase electric motor kept at constant speed under normal operating conditions. The discharge valves $Td$, $Ed$ and $Fd$ are connected by branches to a discharge manifold 2 in which is provided a sludge regulator valve SV which, as will appear below, controls the rate at which the tank being emptied at any time is allowed to discharge. The valve SV is geared to an impulse motor IM which, when it receives a positive or negative impulse, causes the valve SV to open or close by a small amount at each operation.

The inlet valves $Ti$, $Ei$, $Fi$, and the discharge valves $Td$, $Ed$ and $Fd$ are arranged to be opened at appropriate phases in the cycle of operations by the rotation of a shaft 3 connected by bevel gearing 4 to the different valves and driven from an electric motor 5 at an appropriate speed through a reduction gear box 6 during change-over periods determined by the electrical control system. Thus, when the inlet valve of a tank is opened, as is the case with the valve $Fi$, sludge pumped by the pump SP enters the valve $Fi$, as shown by the arrows 7, and fills the tank F. Similarly, when a discharge valve of a tank is opened, as is the case with the valve $Ed$ in the drawing, the sludge in the corresponding tank E is forced out through the valve $Ed$, as shown by the arrows 8, into the discharge manifold 2 at a rate controlled by the regulator valve SV.

The cycle of operation is such that each tank in turn is filled with the sludge. Then its inlet and discharge valves are both maintained closed for a given period, for example 30 minutes, as is shown in the case of the tank T and the valves $Ti$ and $Td$ in the drawing, and during that time the liquid in the tank is subjected to some treatment, such as in the present instance heat treatment of the sludge; at the conclusion of that period, the emptying of the tank is started by opening the valve $Td$ in order that subsequently it may be filled again with fresh sludge for treatment. The time of heat treatment is primarily governed by the rate at which the tank is filled by the sludge feed pump SP which is run at such a speed that the filling of the tank occupies the period necessary for the heat treatment in the tank previously filled.

Thus, it is necessary for the motor 5 to rotate the shaft 3 intermittently, that is to say, in the example under consideration, every 30 minutes, when the shaft 3 is turned relatively quickly through an angle of 120° at each operation with the result that at the next operation following the position shown in the drawing, the tank T will have its discharge valve $Td$ opened so that its contents can discharge to the manifold 2; the tank E will have its inlet valve $Ei$ opened and its discharge valve $Ed$ closed, so that it can be slowly filled with fresh sludge and the tank F, which is now filled, will have its inlet valve $Fi$ closed so that its contents can undergo the treatment for 30 minutes.

In order to control the rotation of the motor 5 and the change-over of the valves, an electrical control system is provided responsive to the liquid levels in the tanks T, E, F. In fact, each tank has a fitting near the top level consisting of a tube $t_1$, $e_1$, and $f_1$ of non-magnetic material in which is located a freely-mounted float or plunger $t_2$, $e_2$, and $f_2$ of magnetic material, preferably soft iron of high permeability. Each pipe $t_1$, $e_1$, $f_1$ has wound around its upper part a coil $t_c$, $e_c$, and $f_c$, the arrangement being such that when the sludge in a tank has reached its highest level, as is the case in the tank T, the sludge in the side pipe $t_1$ lifts the plunger $t_2$ fully into the coil $t_c$ and thereby increases the inductance of the coil. When the tank has been partly emptied, as in the tank E, or when the tank has not yet been filled, as in the tank F, the plungers $e_2$, $f_2$ are not borne up by the sludge but have descended out of the coils $e_c$ and $f_c$. Each coil $t_c$, $e_c$, $f_c$ is bridged by a condenser $c_1$ of such a capacity in relation to the frequency of supply that when the core is raised, as in the case of the tank T, and the inductance of the coil $t_c$ increased, the current flowing in the supply circuit of this coil substantially rises, owing to resonance effects, above the value of the current when the plungers have descended below the coils, as in the case of tanks E and F. Such operation may be obtained where the condenser tunes the inductance of the coil (with core removed) to the frequency of the supply source. The coils $t_c$, $e_c$, $f_c$ in parallel with the condenser $c_1$ are each connected to the secondary winding of a transformer Tr through the winding of a relay $Rt_1$, $Re_1$, and $Rf_1$. The primary of the transformer $Tr$ is supplied from one phase 9 of the three-phase source of supply. Consequently, when a tank is filled, as in the case of the tank T, the associated relay $Rt_1$ is energised, and when a tank is not completely filled, as in the case of the tanks E and F, the relays $Re_1$ and $Rf_1$ are not energised and their middle contacts are opened as shown in the drawing.

Each tank has a similar side tube $t_3$, $e_3$ and $f_3$ near the bottom also encircled by a coil $t_w$, $e_w$ and $f_w$, and containing a freely-mounted plunger $t_4$, $e_4$, and $f_4$ the coils being shunted by condensers $c_2$. Since in the drawing the tank T is shown filled, the tank E only partially emptied and the tank F is being filled and has received some sludge, all the plungers are shown in the raised position in the coils so that the increased current is flowing into the three circuits from the secondary winding of the transformer $Tr$. Each of the circuits includes a coil of a further relay $Rt_2$, $Re_2$, and $Rf_2$ so that these three relays are shown excited with their front contacts closed.

The commencement of a phase in the cycle of operations in the control of the apparatus depends upon the filling of a tank at any particular time, and in the phase shown in the drawing, by the filling of the tank F. As already explained, when the tank F is filled, it is kept in this condition for a period during which its contents undergo a heating or cooking treatment. During that period the tank T will be emptied and the tank E filling. As soon as the filling of the tank T is completed as shown in the drawing, the plunger $t_2$ is lifted and the winding of the relay $Rt_1$ is energised so that this relay closes its upper pair of contacts 10, 11 as shown in the drawing. This results in a circuit being closed from the secondary winding of a further transformer $Tr_1$, the primary of which is also fed from one of the phases 12 of the alternating current supply. The circuit from the secondary winding proceeds by the line $L_1$, conductor 13, contacts 11, 10, conductor 14, to a segment $t$ of a distributor switch RS, the contact arm or brush $b$ of which is on the shaft 3; the circuit then proceeds through the contact arm $b$, which at this instant rests on the segment $t$, and then by way of the conductor 15 through the coil of a motor starter MS, and by way of conductor 16 to line $L_2$ to complete the circuit. The motor 5 is therefore started and rotates the arm $b$ through 120° in a clockwise direction, as indicated by the arrow 17, until the arm $b$ rests on the next segment $f$ of the distributor switch RS. The above-described circuit is interrupted when the arm $b$ leaves the segment $t$ so that the motor 5, shaft 3, and contact arm $b$ rest in the position shown in the drawing, while the contents of the tank T undergo treatment since the shaft 3 has now at the end of its movement shut the inlet valve $Ti$ and moved the discharge valve $Td$ from one closed position to another closed position while it has also opened the inlet valve $Fi$ and closed the discharge valve $Fd$, and finally has moved the inlet valve $Ei$ from one closed position to another closed position and has opened the discharge valve $Ed$. Since each tank T, E, F is taken through the stages of treating, emptying and filling for another treatment in order and during treatment, the inlet valve and the discharge valve are closed, during emptying, the inlet valve is closed and the discharge valve is open while during filling, the inlet valve is open and the discharge valve is closed, it follows that each of the inlet and discharge sludge valves must have two closed positions and one open position in order that the valves may fulfil the necessary functions in the correct sequence.

Thus, when the valves are in the position described above and the system is set as shown in the drawing, emptying of the tank E and filling of the tank F goes on as already described. When the tank F becomes quite filled, the plunger $f_2$ is lifted, the relay winding $Rf_1$ is energised, and this relay closes its upper pair of contacts 18, 19. There is, therefore, a similar circuit to that described now closed from the secondary of the transformer $Tr_1$ through contacts 19, 18, segment $f$, arm $b$, so that the motor 5 is again set into movement, shifting the contact arm $b$ on to the third segment $e$ of the distributor switch RS, and re-setting the valves in the tanks T, E, F to keep the tank F filled for the desired period, to start the filling of the tank E and the emptying of the tank T. Consequently, during a complete cycle in which the shaft 3 has made a complete revolution, each of the tanks T, E, F has been filled in turn, the filling of each occupying a period of 30 minutes, the treatment in each occupying a period of 30 minutes, and then each tank has been emptied occupying a third period of 30 minutes.

It may happen that when one of the tanks, for instance the tank F is filled, another tank, that is the tank E in the example illustrated, has not been entirely emptied, or owing to the lifting of the plunger $f_2$ by the sludge in the tank F too soon, the sludge in one of the tanks, for instance the tank E, that has been undergoing the cooking treatment, may commence to be discharged before that treatment has been fully completed. In order to deal with such contingencies, the following arrangements are provided designed to increase or reduce the rate of discharge of the sludge from the tank in which the treatment has last been carried out. This is effected by regulation of the valve SV in the discharge manifold 2. The motor IM, as already indicated, is of the known type which, on receiving a positive impulse, rotates a fixed amount in one direction, and when receiving a negative impulse, rotates the same amount in the opposite direction; it is geared to the valve SV so that in either case it adjusts the opening of that valve to a small degree and then maintains the valve so set. The effect is obtained by means of the middle and lower contacts of the relays $Rt_1$, $Re_1$, and $Rf_1$, and the contacts of the relays $Rt_2$, $Re_2$, $Rf_2$, in conjunction with two distributor switches DO and DS, the contact arms $o$ and $s$ of which are carried by the shaft 3 which rotates in step-by-step fashion in the clockwise direction indicated by the arrows 20, 21, in much the same way as it rotates the contact arm $b$.

Both the tank F which is being filled and the tank E which is being emptied, are in the same condition as regards the associated relays, that is to say, since the sludge in each of these tanks is not at the top level, the relays $Re_1$, $Rf_1$ are both de-energised and their lowest pair of contacts is closed. Also, since neither tank is completely emptied, the relays $Re_2$, $Rf_2$ are both energised and their upper pair of contacts are both closed. It should be noted, however, that as soon as the tank F is filled to the upper level, the relay $Rf_1$ will be energised, interrupting its lowest pair of contacts and closing its middle pair of contacts, whereas as soon as the tank E is fully emptied, its relay R$e_2$ will be de-energised, opening its upper pair of contacts and closing its lower pair of contacts.

In order to explain the operation of the system illustrated, assume that the tank F becomes filled to the top level before the tank E becomes fully emptied. Then, as just mentioned, the relay R$f_1$ is energised and its middle pair of contacts 22, 23 are closed. The result of this is that a circuit is completed as follows. From the secondary winding of the transformer T$r_1$ through the contacts 23, 22, conductor 24, upper contacts 25, 26 of the relay R$e_2$, conductor 27, segment $f_o$ of the distributor switch DO, contact arm $o$, conductor 28, through the coil of the motor reverse switch MS, which causes the motor IM to turn one step in the direction to open the valve SV, and thence through conductor 29 and line L$_2$ back to the transformer T$r_1$. Therefore, the valve SV is opened slightly which results in the tank-emptying operation being accelerated so that at the next operation a tank should be emptied more closely in the time occupied by the filling of a tank.

If, on the other hand, the tank E is being emptied faster than the tank F is being filled, it is obviously desirable to close down the valve SV somewhat. In this case, the liquid in the tank E will cause the relay R$e_2$ to be de-energised before the liquid in the tank F rises sufficiently to energise the relay R$f_1$ so that the latter is still de-energised and its contacts 30, 31 remain closed. In this case, therefore, there is a circuit from the transformer T$r_1$ by way of line L$_1$, contacts 31, 30, lower contacts 33, 32 of the relay R$e_2$ which have just been closed, conductor 34, segment $f_s$ of the distributor switch DS, contact arm $s$, and then through the other coil of the motor reverse switch MS and by the conductor 29 to complete the circuit as before. In this case, therefore, the motor IM rotates one step in the opposite direction slightly to close the valve SV.

It will be appreciated that if the emptying and the filling of the tanks both take place at the correct rates, and relay R$f_1$ is therefore energised at the same time as the relay R$e_2$ is de-energised, both the circuits which result in opening and closing the valve SV will be interrupted at these relays and no adjustment of the valve SV will be made during that cycle.

In the above description of the operation and adjustments, the phase of operations shown in the drawing has been taken as an example, but it will be clear that at the other two phases of the operation the conditions of the tanks are interchanged and the corresponding relays associated with the other tanks, and the corresponding segments of the distributors DO and DS will take part in the completion, if such occurs, of the circuits which control the opening and closing of the valve SV. It is for that reason that no detailed reference is made to the contacts of the relays R$e_1$, R$t_2$, R$f_2$, and the middle and lower contacts of the relay R$t_1$ or to the circuits which they control.

The system is, of course, susceptible to various modifications. Thus, while the regulation of the rate of operation is taken in the example as being effected by controlling the outlet sludge regulating valve SV in the discharge manifold 2, by means of the impulse motor IM, it is possible to control such valve by means of solenoids or electro-magnet coils opening and closing the valve through ratchet gear; as an alternative, it is possible to provide a pump in the discharge manifold 2 for removing the sludge and to increase or decrease the speed of such pump by means of the interlock contacts of the various relays. It would also be possible to effect the regulation by varying the rate of feed of the sludge to the tanks by controlling the speed of the feed pump SP. Again, as described, each of the tanks T, E, F is furnished with a high-level controlling device near the top and a low-level controlling device near the bottom, but a single long tube of the nature of a gauge glass may be used extending from top to bottom of the tank and containing both the high-level and low-level plungers such as $t_2$ and $t_4$, the downward movement of the former and the upward movement of the latter being limited by stops. The coils such as $t_c$ and $t_w$ are mounted in suitable positions.

As described in connection with the drawing, three tanks are dealt with, but it is quite clear that that is taken purely as an example because it is possible to employ only two vessels and to effect the cooking or other treatment during the filling of each of the vessels. In the more usual case in practice, however, there will ordinarily be more than one tank kept filled and in which the sludge is under treatment at one time so that there might, in a comparatively simple case, in fact be four tanks of which one is being filled, one emptied, and the contents of the remaining two tanks are under treatment at any time. It is obvious too that a single set of control gear, as illustrated, could be used to actuate the inlet and discharge valves of more than one set of tanks.

I claim:

1. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a plurality of rotary inlet valves each controlling one of said inlet conduits and having one open position and two closed positions, a plurality of rotary discharge valves each controlling one of said outlet conduits and having one open position and two closed positions, an electric motor, gearing connecting said electric motor to each of said rotary valves, a source of electrical supply to said motor, circuit connections between said source of supply and said motor, a distributor switch driven by said motor and furnished with three contacts each of which is located in said circuit connections in one of the three positions of said valves, and a plurality of electrical controllers each associated with one of said vessels and responsive to the level of the material therein, and an electromagnetic switch controlled by each of said controllers to close its contacts in said circuit connections to said motor to cause actuation of the latter through one step to effect a change-over of said valves, whereupon said motor is arrested by the interruption of said circuit connections by said distributor switch.

2. A system for controlling the cyclic filling with a fluid material and emptying of a plurality of vessels, comprising in combination with said vessels, an inlet conduit and an outlet conduit for each of said vessels, means for admitting the fluid material to said inlet conduits and for discharging the fluid material from said outlet conduits, a plurality of electric controllers each associated with one of said vessels and each comprising a conduit in communication with the material in one of said vessels, a float of magnetic material therein, and a coil encircling said conduit, a source of electrical supply for said coils, and circuit connections from said source of supply to said coils, and a plurality of electromagnetic devices each in said circuit connections, and means controlled by one only of said electromagnetic devices for controlling said admitting and discharging means to effect change-over from the filling of one vessel to the filling of another vessel when the material in one of said vessels reaches a predetermined level.

3. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a plurality of inlet valves each controlling one of said inlet conduits, a plurality of discharge valves each controlling one of said outlet conduits, a plurality of electric controllers each associated with one of said vessels and each comprising a conduit in communication with the material in one of said vessels, a float of magnetic material therein, and a coil encircling said conduit, a source of electrical supply for said coils, circuit connections from said source of supply to said coils, and a plurality of electromagnetic devices each in said circuit connections, and means controlled by one only of said electromagnetic devices to effect the opening of the inlet valve to one of said vessels which is empty and the opening of the discharge valve for one of said vessels which is filled, when the material in one of said vessels reaches a predetermined level.

4. A system for controlling the cyclic filling with a fluid material and emptying of a plurality of vessels, comprising in combination with said vessels, an inlet conduit and an outlet conduit for each of said vessels, means for admitting the fluid material to said inlet conduits and for discharging the fluid material from said outlet conduits, an alternating current source of electrical supply, a plurality of electric controllers each associated with one of said vessels and each comprising a conduit in communication with the material in one of said vessels, a float of magnetic material therein, a coil encircling said conduit, and a capacitance in parallel with said coil to tune the inductance thereof to the frequency of said source of supply, circuit connections from said source of supply to said coils, and a plurality of electromagnetic devices each in said circuit connections and in operative connection with said admitting and discharging means for controlling the change-over in the phase of operations from the filling of one of said vessels to the filling of another of said vessels.

5. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a plurality of inlet valves each controlling one of said inlet conduits, a plurality of discharge valves each controlling one of said outlet conduits, an alternating current source of electrical supply, a plurality of electric controllers each associated with one of said vessels, and each comprising a conduit in communication with the material in one of said vessels, a float of magnetic material therein, a coil encircling said conduit, and a capacitance in parallel with said coil to tune the inductance thereof to the frequency of said source of supply, circuit connections from said source of supply to said coils, and a plurality of electromagnetic devices each in said circuit connections and in operative connection with each of said inlet valves and with each of said discharge valves to control the opening of the inlet valve to one of said vessels which is empty, and to control the opening of the discharge valve from one of said vessels which is filled.

6. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a plurality of inlet valves each controlling one of said inlet conduits, a plurality of discharge valves each controlling one of said outlet conduits, an electric motor in operative connection with said inlet valves and with said discharge valves, a source of electrical supply for said motor, circuit connections between said source of supply and said motor, a distributor switch driven by said motor through one step at each actuation of said valves and having contacts included in said circuit connections to said motor, a plurality of high level electrical controllers each associated with one of said vessels and each comprising a conduit in communication with the material in one of said vessels, a float of magnetic material therein, and a coil encircling said conduit, a plurality of low level electrical controllers each associated with one of said vessels and each also comprising a conduit in communication with the material in one of said vessels, a float of magnetic material therein, and a coil encircling said conduit, a source of electrical supply for said coils, and circuit connections from said last-mentioned source of supply to said coils, a plurality of electromagnetic switches each included in said circuit connections to said coils of said high level controllers, and having contacts included in said circuit connections to said motor to cause actuation of the latter through one step to effect a change-over of said valves, whereupon said motor is arrested by the interruption of said circuit connections by said distributor switch, a plurality of electromagnetic switches each included in said circuit connections to the coils of said low level controllers, circuit connections interlocking contacts of said first-named electromagnetic switches and contacts of said second-named electromagnetic switches, and means for adjusting the relative rates of filling of one of said vessels and of emptying another of said vessels which is being emptied while said first-named vessel is being filled.

7. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a discharge manifold in communication with said outlet conduits, a plurality of inlet valves each controlling one of said inlet conduits, a plurality of discharge valves each controlling one of said outlet conduits, an electric motor in operative connection with said inlet valves and with said discharge valves, a source of electrical supply for said motor, circuit connections between said source of supply and said motor, a distributor switch driven by said motor through one step at each actuation of said valves and connected in said circuit connections to said motor, a plurality of high level electrical controllers each associated with one of said vessels and each comprising a conduit in communication with the material in one of said vessels, a float of magnetic material therein, and a coil encircling said conduit, a plurality of low level electrical controllers each associated with one of said vessels and each also comprising a conduit in communication with the material in one of said vessels, a float of magnetic material therein, and a coil encircling said conduit, a source of electrical supply for said coils, circuit connections from said source of supply to said coils, a plurality of electromagnetic devices each in said circuit connections to said coils of said high level controllers, and having contacts in said circuit connections to said motor to cause actuation of the latter through one step to effect a change-over of said valves, whereupon said motor is arrested by the interruption of said circuit connections by said distributor switch, a plurality of electromagnetic switches each in said circuit connections to the coils of said low level controllers, circuit connections interlocking contacts of said first-named electromagnetic switches and contacts of said second-named electromagnetic switches, an adjustable valve in said discharge manifold for regulating the rate of emptying of said vessels and an electrical motor operatively connected to said adjustable valve and controlled through the interlocked contacts of said electromagnetic switches.

8. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a discharge manifold in communication with said outlet conduits, a plurality of inlet valves each controlling one of said inlet conduits, a plurality of discharge valves each controlling one of said outlet conduits, an electric motor in operative connection with said inlet valves and with said discharge valves, a source of electrical supply for said motor, circuit connections between said source of supply and said motor, a distributor switch driven by said motor through one step at each actuation of said valves, and connected in said circuit connections to said motor, a plurality of high level electrical controllers each associated with one of said vessels and each comprising a conduit in communication with the material in one of said vessels, a float of magnetic material therein, and a coil encircling said conduit, a plurality of low level electrical controllers each associated with one of said vessels and each also comprising a conduit in communication with the material in one of said vessels, a float of magnetic material therein, and a coil encircling said conduit, a source of electrical supply to said coils, circuit connections from said source of supply to said coils, a plurality of electromagnetic switches each in said circuit connections to said coils of said high level controllers, and having contacts in said circuit connections to said motor to cause actuation of the latter through one step to effect a change-over of said valves, whereupon said motor is arrested by the interruption of said circuit connections by said distributor switch, a plurality of electromagnetic switches each in said circuit connections to the coils of said low level controllers, circuit connections interlocking contacts of said first-named electromagnetic switches and contacts of said second-named electromagnetic switches, an adjustable valve in said discharge manifold for regulating the rate of emptying of said vessels, and a reversible electric impulse motor in operative connection with said adjustable valve for operating said valve to regulate the rate of emptying of said vessels and connected to receive positive and negative electrical impulses under the control of the interlocked contacts of said electromagnetic switches.

9. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a discharge manifold in communication with said outlet conduits, a plurality of inlet valves each controlling one of said inlet conduits, a plurality of discharge valves each controlling one of said outlet conduits, an electric motor in operative connection with said inlet valves and with said discharge valves, a source of electrical supply for said motor, circuit connections between said source of supply and said motor, a distributor switch driven by said motor through one step at each actuation of said valves and connected in said circuit connections to said motor, a plurality of high level electrical controllers each associated with one of said vessels and each comprising a conduit in communication with the material in one of said vessels, a float of magnetic material therein, and a coil encircling said conduit, a plurality of low level electrical controllers each associated with one of said vessels and each also comprising a conduit in communication with the material in one of said vessels, a float of magnetic material therein, and a coil encircling said conduit, a source of electrical supply to said coils, circuit connections from said source of supply to said coils, a plurality of electromagnetic devices each in said circuit connections to said coils of said high level controllers, and having contacts in said circuit connections to said motor to cause actuation of the latter through one step to effect a change-over of said valves, whereupon said motor is arrested by the interruption of said circuit connections by said distributor switch, a plurality of electromagnetic switches each in said circuit connections to the coils of said low level controllers, circuit connections interlocking contacts of said first-named electromagnetic switches and contacts of said second-named electromagnetic switches, an adjustable valve in said discharge manifold for regulating the rate of emptying of said vessels, a reversible electric impulse motor in operative connection with said adjustable valve for operating said valve to regulate the rate of emptying of said vessels, a pair of distributor switches driven by said electric motor and having contacts respectively connected to the contacts of one of said electromagnetic switches controlled by the low level controller associated with a vessel which is being emptied and with the contacts of an electromagnetic switch controlled by the high level electric controller of another of the vessels which is being filled at the same time and an electromagnetic reversing switch having coils connected respectively to said last-mentioned distributor switches and with connections to said impulse motor so as to supply impulses to said impulse motor of a sense depending upon the relative rates of filling and emptying of said vessels.

10. A system for controlling the cyclic filling and emptying of a plurality of vessels according to claim 2 wherein at least three vessels are provided and controlled so that at any given time one vessel is being filled, another is being emptied, and a third vessel remains filled for treatment, and wherein the change-over in phase of operation is effected by a high-level controller associated with the vessel being filled.

11. A system for controlling the cyclic filling and emptying of a plurality of vessels according to claim 2 wherein at least three vessels are provided and controlled so that at any given time one vessel is being filled, another is being emptied, and a third vessel remains filled for treatment, and wherein the change-over in phase of operation is effected by a low-level controller associated with the vessel being emptied.

12. A system according to claim 2 and including distributor means operated at each change-over operation for shifting the control of said admitting and discharging means from one electromagnetic device to another.

WILLIAM KING PORTEOUS.